S. F. LESLIE.
COUPLING DEVICE.
APPLICATION FILED DEC. 22, 1910.

1,027,861.

Patented May 28, 1912.

4 SHEETS—SHEET 1.

Witnesses

Inventor
S. F. Leslie
by
Atty

S. F. LESLIE.
COUPLING DEVICE.
APPLICATION FILED DEC. 22, 1910.

1,027,861.

Patented May 28, 1912.

4 SHEETS—SHEET 2.

Witnesses

Inventor

S. F. LESLIE.
COUPLING DEVICE.
APPLICATION FILED DEC. 22, 1910.

1,027,861.

Patented May 28, 1912.

4 SHEETS—SHEET 3.

S. F. LESLIE.
COUPLING DEVICE.
APPLICATION FILED DEC. 22, 1910.

1,027,861.

Patented May 28, 1912.

4 SHEETS—SHEET 4.

Witnesses

Inventor
S. F. Leslie

UNITED STATES PATENT OFFICE.

SYLVESTER FRANCIS LESLIE, OF NEWCASTLE, NEW SOUTH WALES, AUSTRALIA.

COUPLING DEVICE.

1,027,861.      Specification of Letters Patent.      Patented May 28, 1912.

Application filed December 22, 1910. Serial No. 598,816.

*To all whom it may concern:*

Be it known that I, SYLVESTER FRANCIS LESLIE, a subject of the King of Great Britain and Ireland, residing at Newcastle, in the State of New South Wales, Commonwealth of Australia, have invented certain new and useful Improvements in Coupling Devices, of which the following is a specification.

Owing to the numerous accidents occurring during the operation of coupling and uncoupling railway vehicles it is considered that a coupling device which can be operated from the side of the vehicles will prove of great utility as tending to minimize the danger attendant upon the coupling operation.

This invention is devised with the object of obviating this danger and providing a coupling so arranged that the parts may be coupled together from the side of the vehicle or track. But in order that my invention may be clearly understood I shall now refer to the accompanying drawings in which:—

Figure 1:
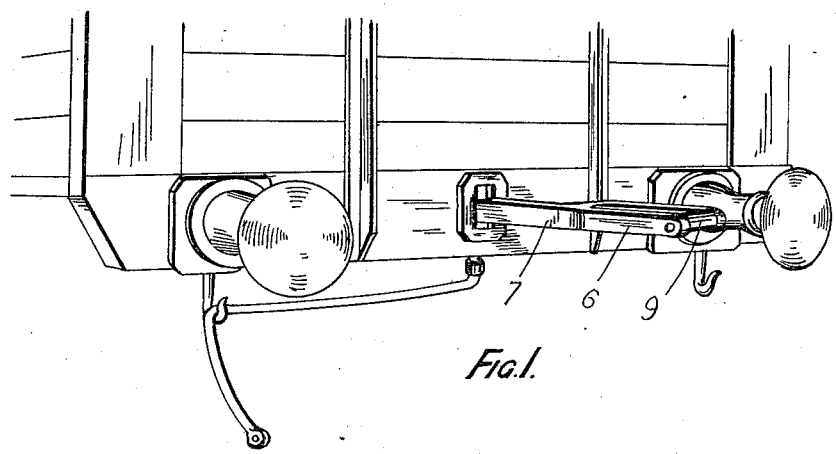
Figure 2:
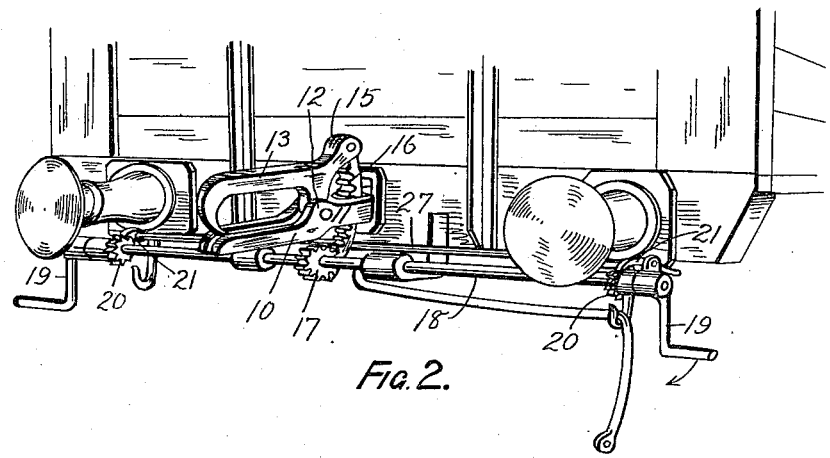
Figure 3:
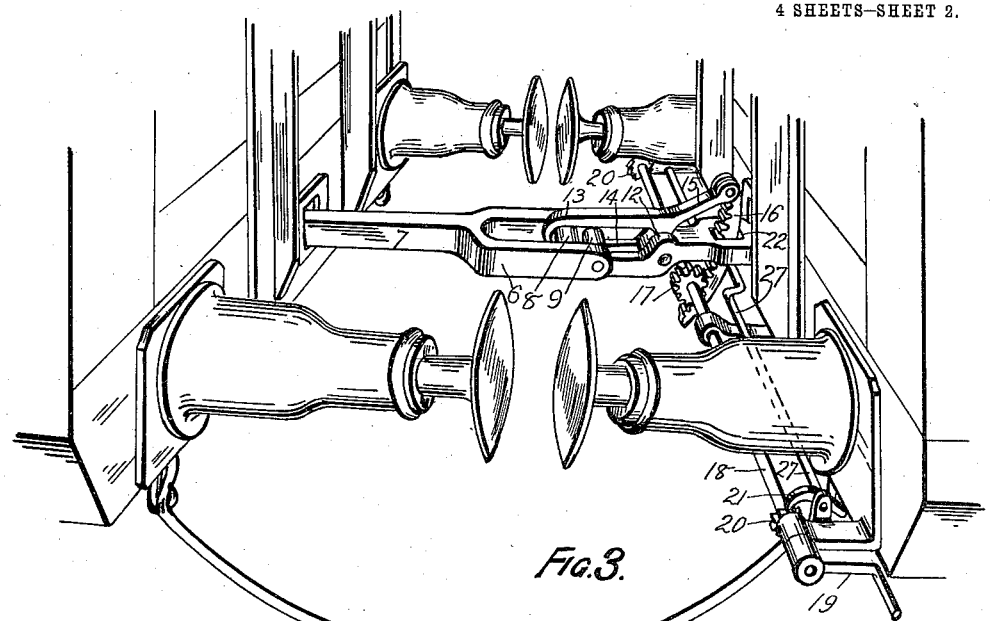
Figure 4:
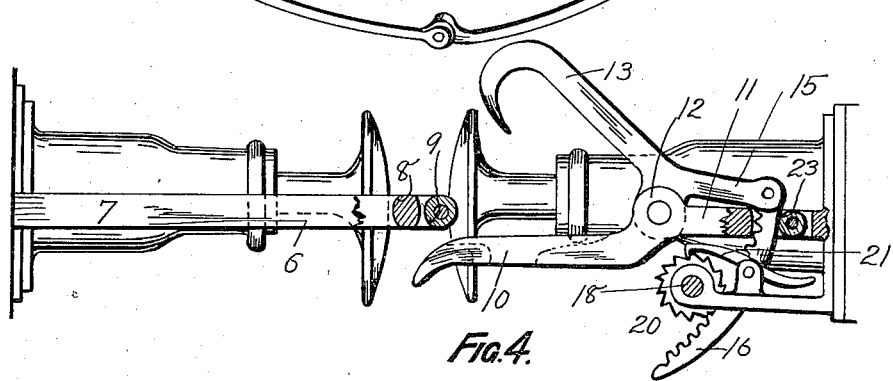
Figure 5:
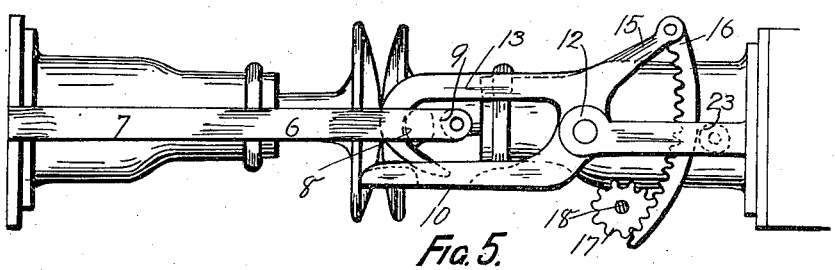
Figure 6:
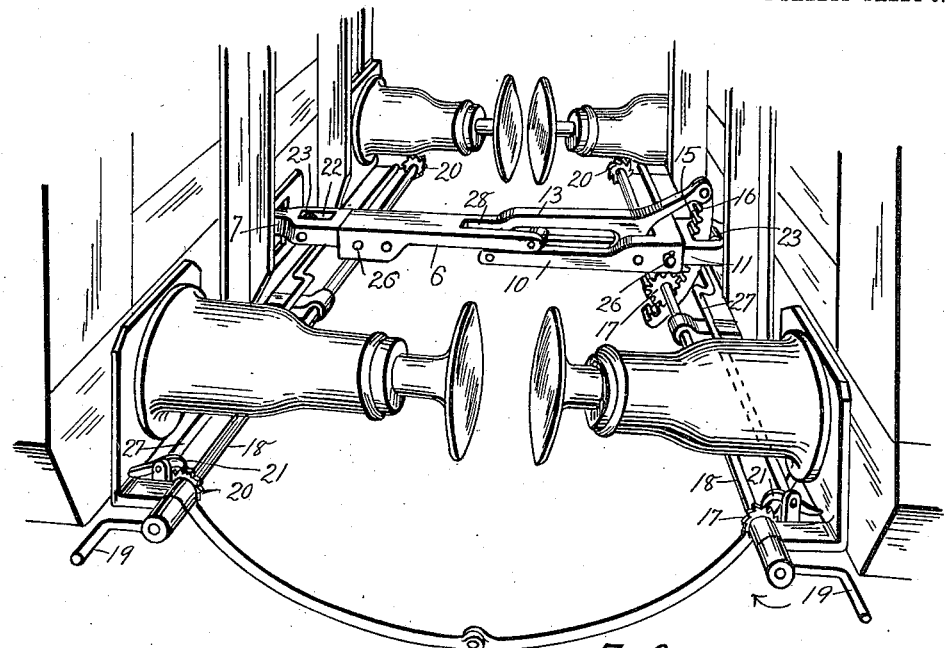
Figure 7:
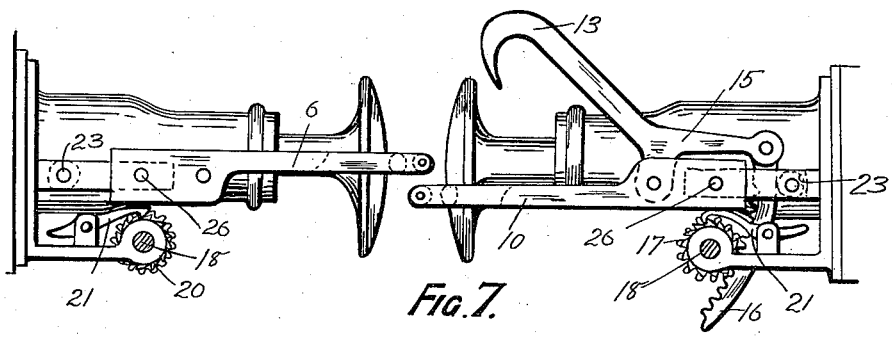
Figure 8:
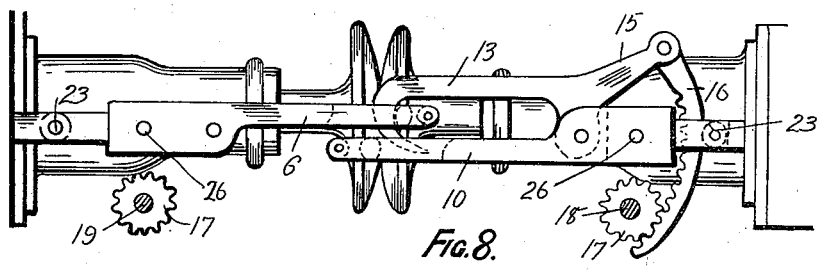
Figure 9:
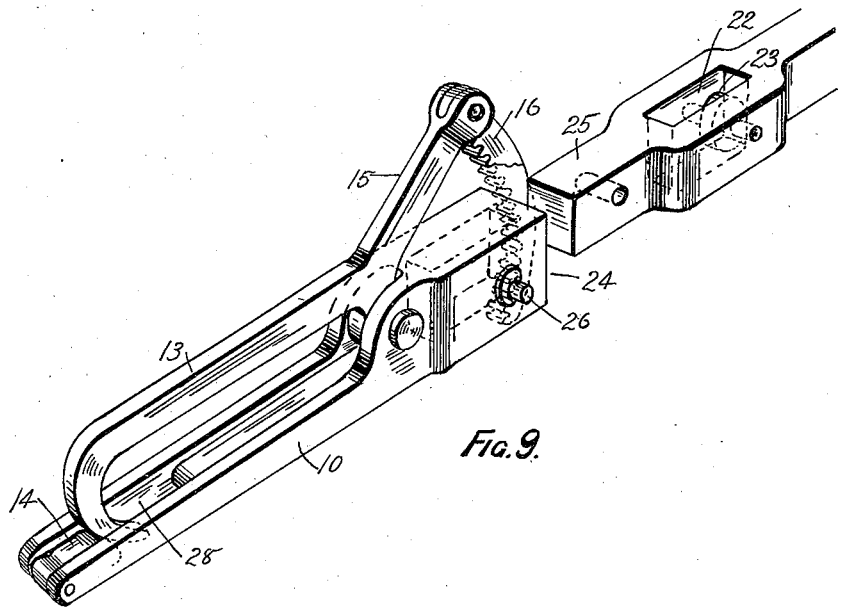

Figure 1 is an end perspective view of a truck with the male portion attached. Fig. 2 is an end perspective view of a truck with the female portion and operating mechanism attached. Fig. 3 is a perspective view showing two trucks coupled together. Fig. 4 is an enlarged side elevation part section showing the parts uncoupled or ready to couple. Fig. 5 is an enlarged side elevation showing the parts coupled. Fig. 6 is a similar view to Fig. 3 but showing both members detachably connected to their respective drawbars and the operating mechanism provided on the opposing ends of two vehicles. Fig. 7 is a similar view to Fig. 4 with the additions as in Fig. 6. Fig. 8 is a similar view to Fig. 5 with the additions as in Figs. 6 and 7. Fig. 9 is an enlarged perspective view showing details of the detachable member and the construction of the end of the drawbar therefor.

Referring particularly to Figs. 1 to 5 inclusive:—The yoke 6 of the male portion is attached to or made integral with the drawbar 7 and is provided with a solid integral crosspiece 8 designed to take the pull, and a roller 9 designed to roll on the inclined end of the lower female member or keeper 10. The keeper 10 is made integral with the drawbar 11 and is provided with a pair of lugs 12 between which is pivoted the upper or hook member 13. The hook 13 extends into the slot 14 formed in the lower member, thereby forming a guard to prevent the yoke member from being accidentally released.

The hook 13 is provided with a tail piece 15 pivotally connected to the top of the segmental toothed rack 16 which passes vertically through a slot 22 in the drawbar 11 and gears with the pinion 17 mounted upon the shaft 18 extending laterally across the vehicle and provided on each end with a handle 19.

In order to enable the hook 13 to be retained in the open position a ratchet wheel 20 is provided near each end of the shaft 18 and a pawl 21 engages therewith for the purpose mentioned. The pawls on opposite sides of the vehicle are connected by a shaft 27 in order that the mechanism may be operated from either side. The rack 16 is retained in gear with the pinion by a roller 23 mounted in the slot 22.

In Figs. 6, 7, 8 and 9 the same reference numerals as in the preceding figures are used to indicate corresponding parts, and in these figures a slight modification is shown. In Figs. 1-5 the coupling members are made in one with the draw bars, but in the modification the ends of the draw bars are provided with a squared portion 25, the coupling members being independent thereof and each provided with a squared socket 24 adapted to receive the squared end of one of the draw bars. With this construction the coupling members may be interchanged to avoid reversing a car under circumstances where for instance, two male members were opposed. Each draw bar is also provided, to the rear of the squared end, with a slot 22 to accommodate the segmental rack. The male member is made an exact duplicate of the lower jaw or keeper 10 of the female member, so that instead of removing the whole coupling, under some circumstances, the hook jaw member with its segmental rack may be separated from the lower jaw or keeper and the said lower jaw twisted around to form a male member 6, the male member being similarly twisted around and the hook jaw attached thereto, thus forming a female member.

The squared end of the draw bar may be retained securely in engagement with the squared socket of a coupling member by a pin 26 passing through said socket and squared end.

As before stated an operating shaft 18 with ratchet 20 and pinion 17 is provided upon each end of the vehicle in order to permit manipulation of the coupling in the changed positions of the members.

The operation of opening the hook is performed by turning the handle 19 in the direction indicated by the arrow heads in Figs. 2, 3 and 6 thus lowering the tail piece and raising the hook to the position shown in Figs. 4 and 7. The vehicle carrying the corresponding male member is then backed so that the transverse yoke bar 8 and roller 9 enter the open mouth of the hook. The handle 19 is then reversed and the hook member closed, thereby forming an effective coupling which is easily and safely manipulated.

What I claim and desire to secure by Letters Patent is:—

1. In a coupling device, a draw bar having a rigid lower jaw member at the outer end thereof, an upper jaw member having a hooked outer end and pivoted at the other end to the lower jaw member adjacent to the inner end thereof, and having an upwardly inclined tail piece integral therewith, a segmental rack pivoted at its upper end to the extremity of said tail piece, a toothed pinion coacting with said rack, means for turning said pinion thereby opening or closing said upper jaw member, and a link member adapted to engage between said jaw members.

2. In a device of the class described, a draw bar having a rigid lower jaw member at the outer end thereof and a vertical slot inward of said lower jaw member, a roller journaled within one end of said slot, an upper jaw member having a hooked outer end and pivoted at its inner end to said lower jaw member near the inner end thereof and having an upwardly inclined tail piece, a bowed member toothed on its inner surface extending through said slot with its plain surface contacting said roller and pivoted at its upper end to the extremity of said tail piece, a toothed pinion suitably journaled below said lower jaw member and engaging said bowed member, means for turning said pinion, and a rigid link adapted to extend between said jaws and engage said hooked end of the upper jaw member.

3. In a device of the class described, in combination, a pair of opposing draw bars, each having a squared end and a vertical guide-slot to the rear of said squared end, a rigid link having a squared socket at one end thereof adapted to receive the squared end of one of the said draw bars, a rigid lower jaw member having a squared socket at its inner end adapted to receive the squared end of the other draw bar, an upper jaw member pivoted near its inner end to said lower jaw member and having a hooked outer end adapted to engage said rigid link, means for swinging said upper jaw member on its pivot, said means comprising as part thereof a segmental rack member depending through a vertical guide-slot aforesaid, and means for locking said squared ends in engagement with said squared sockets, whereby the coupling members are made interchangeable on said draw bars.

Signed at Newcastle, N. S. W., Australia, this day 22nd of October 1910.

SYLVESTER FRANCIS LESLIE.

Witnesses:
ALEXANDRE B. GILBERT,
W. E. GILBERT.

Copies of this patent may be obtained for five cents each, by addressing the "Commissioner of Patents, Washington, D. C."